United States Patent

Yu

Patent Number: 5,692,801
Date of Patent: Dec. 2, 1997

[54] BICYCLE SADDLE WITH AN ENHANCED SHOCK-ABSORBING CAPABILITY

[75] Inventor: Tsai-Yun Yu, Taichung Hsien, Taiwan

[73] Assignee: Selle Tech Industrial Co., Ltd., Taichung Hsien, Taiwan

[21] Appl. No.: 741,907

[22] Filed: Oct. 31, 1996

[30] Foreign Application Priority Data

Sep. 21, 1996 [TW] Taiwan ................................. 85214645

[51] Int. Cl.$^6$ ........................................................ B60N 2/38
[52] U.S. Cl. ............................................................ 297/195.1
[58] Field of Search ........................... 297/195.1, 196, 297/195.11, 215, 216.1, 463.1, 463.2; 2678/131–133, 142, 145

[56] References Cited

U.S. PATENT DOCUMENTS 5,544,936  8/1996  Bigolin .......................... 297/195.1

FOREIGN PATENT DOCUMENTS 1518226  7/1978  United Kingdom .................. 267/145

*Primary Examiner*—Milton Nelson, Jr.
*Attorney, Agent, or Firm*—Beveridge, DeGrandi, Weilacher & Young, LLP

[57] ABSTRACT

A bicycle saddle includes a saddle body, a front mounting socket member, a pair of spring cantilevers, and a bracket. The saddle body has a front converging portion, a rear diverging portion and a downwardly extending skirt portion. The front mounting socket member is formed at the bottom side of the front converging portion. The spring cantilevers extend from the internal face of the skirt portion toward one another so that a space is formed between the spring cantilevers and the bottom side of the rear diverging portion. Each of the spring cantilevers has an engaging portion formed at the free end thereof. The bracket has a converging bent front end which is inserted into the front mounting socket member and a pair diverging arms. Each of the diverging arms has a free end which engages a respective one of the engaging portions of the spring cantilevers.

3 Claims, 5 Drawing Sheets

5,692,801

BICYCLE SADDLE WITH AN ENHANCED SHOCK-ABSORBING CAPABILITY

BACKGROUND OF THE INVENTION

1. Field of the Invention

This invention relates to a bicycle saddle, more particularly to a bicycle saddle with an enhanced shock-absorbing capability.

2. Description of the Related Art

Referring to FIG. 1, a conventional bicycle saddle 10 is shown to comprise a saddle body 11 and a bracket 12. The saddle body 11 has a front converging portion with a mounting socket 111 on its bottom side, and a rear diverging portion with two mounting sockets 112 on its bottom side. The bracket 12 is mounted to the bottom side of the saddle body 11 and is connected to a coupler 21 of a seat post 20. The bracket 12 is formed by bending a metal rod and has a front bent portion 121 which is inserted into the mounting socket 111 and two diverging arms 122 which are inserted into the mounting sockets 112. A problem encountered with the above mentioned construction arises from its insufficient shock absorbing characteristics. When the saddle body 11 is subjected to a shock wave, the shock wave is transmitted directly to the arms 122 of the bracket 12. A counteracting force is produced by the bracket 12 and is transferred back to the saddle body 11 via the front portion 121 and the diverging arms 122. Therefore, the user suffers from discomfort when the saddle 10 is subjected to shock.

SUMMARY OF THE INVENTION

The main object of the present invention is to provide a bicycle saddle with an enhanced shock-. absorbing capability.

According to the present invention, a bicycle saddle comprises a saddle body, a front mounting socket member, a pair of spring cantilevers, and a bracket. The saddle body has a front converging portion, a rear diverging portion and a downwardly extending skirt portion. The front mounting socket member is formed at the bottom side of the front converging portion. The spring cantilevers extend from the internal face of the skirt portion toward one another so that a space is formed between the spring cantilevers and the bottom side of the rear diverging portion. Each of the spring cantilevers has an engaging portion formed at the free end thereof. The bracket has a converging bent front end which is inserted into the front mounting socket member and a pair diverging arms. Each of the diverging arms has a free end which engages a respective one of the engaging portions of the spring cantilevers.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
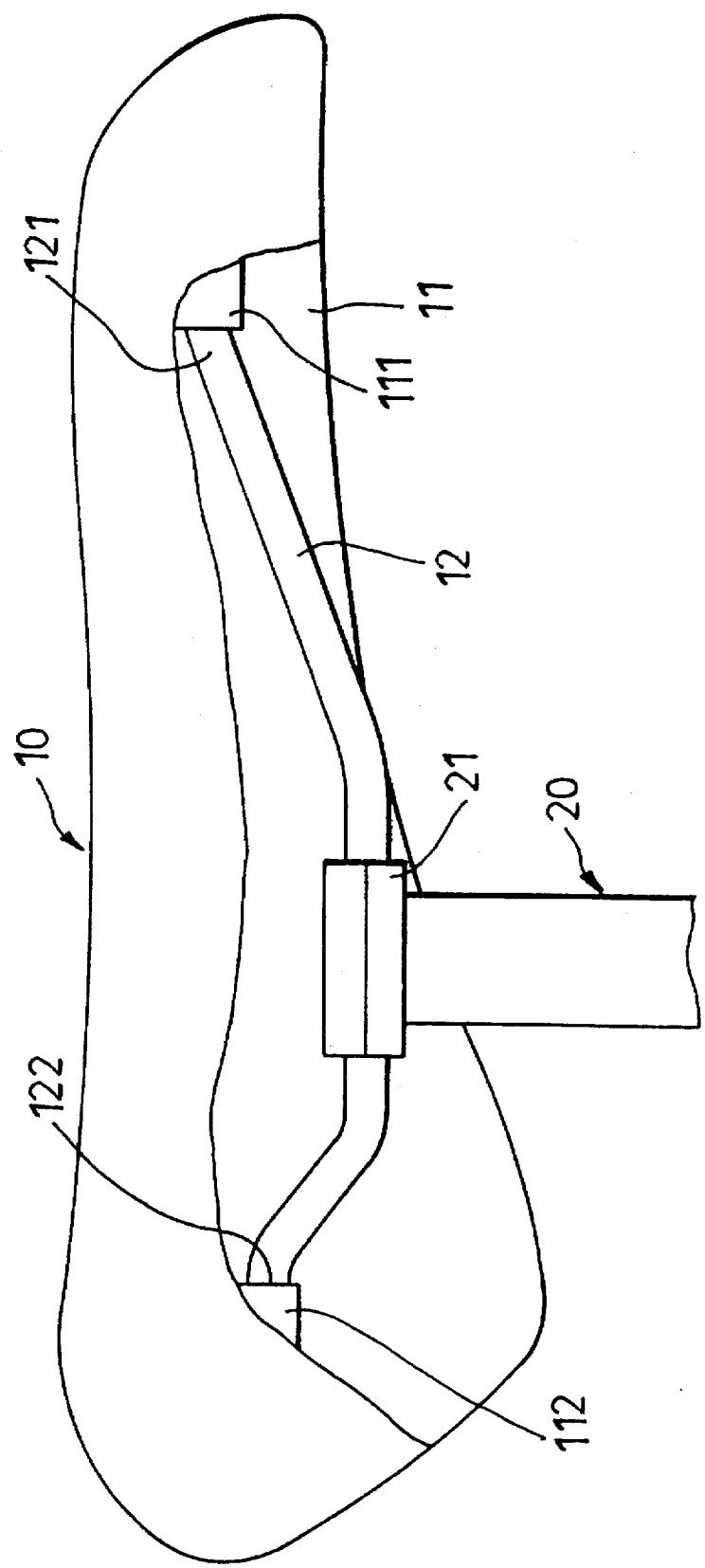
FIG. 1 is a schematic view of a conventional bicycle saddle.

Before the present invention is disclosed in greater detail, it should be noted that like elements are denoted by the same reference numerals throughout the disclosure.

Figure 2:
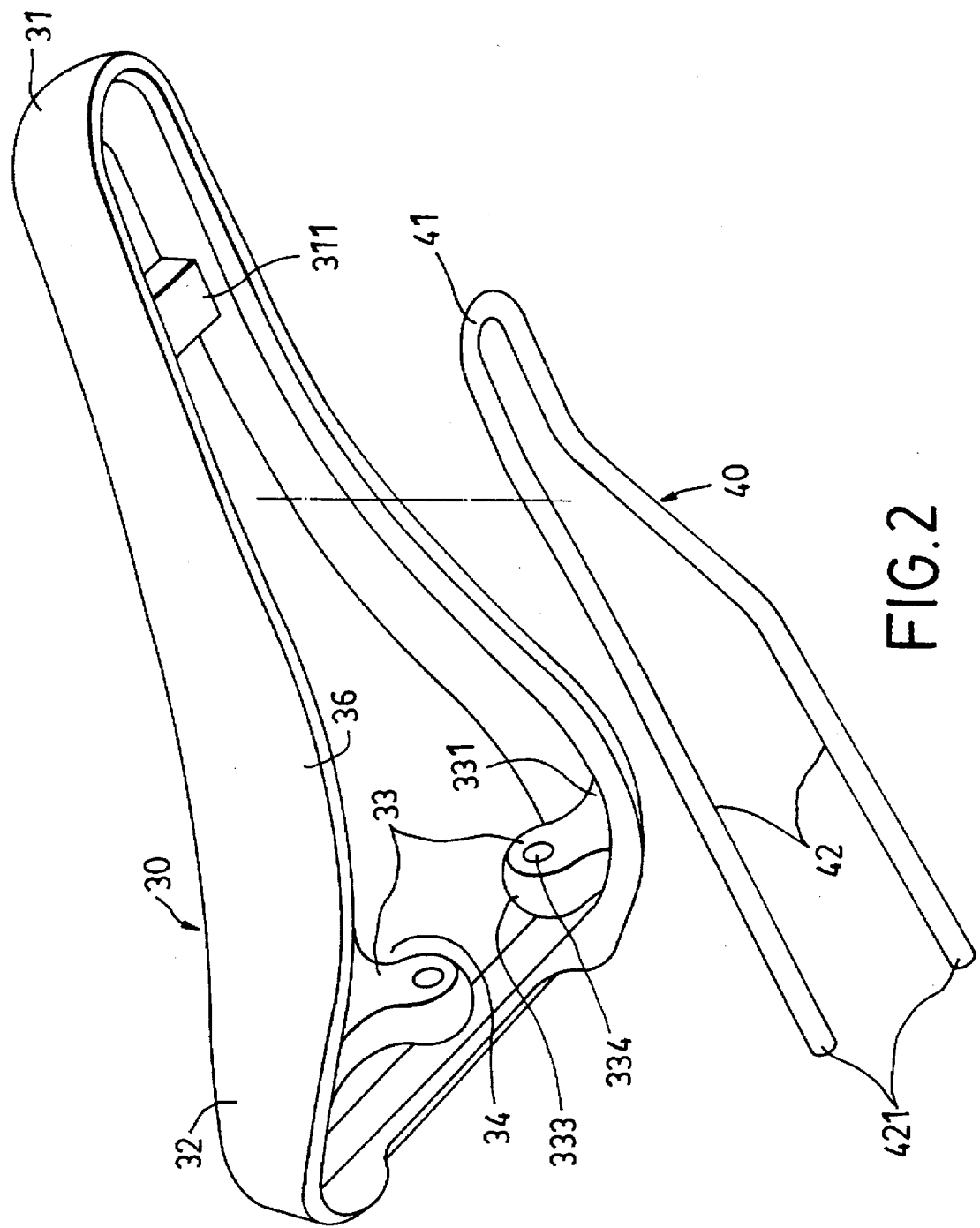
FIG. 2 is an exploded view of a first preferred embodiment of a bicycle saddle according to the present invention.

Referring to FIG. 2, a first preferred embodiment of a bicycle saddle according to the present invention is shown to comprise a saddle body 30 and a bracket 40. The saddle body 30 is made of a rigid plastic material and has a front converging portion 31, a rear diverging portion 32 and a downwardly extending skirt portion 36. A front mounting socket member 311 is formed at the bottom side of the front converging portion 31. A pair of spring cantilevers 33 extend from the internal face of the skirt portion 36 toward one another so that a space 34 is formed between the spring cantilevers 33 and the bottom side of the rear diverging portion 32. Each of the spring cantilevers 33 has a large base portion 331 formed near the saddle body 30 in order to increase the structural strength of the spring cantilevers 33. Each of the spring cantilevers 33 further has an engaging portion 333 formed at the free end thereof. The engaging portion 333 of each of the spring cantilevers 33 has an engaging hole 334 formed therein.

The bracket 40 has a converging bent front end 41 which is inserted into the front mounting socket member 311 and a pair diverging arms 42. Each of the diverging arms 42 has a free end 421 which engages a respective one of the engaging holes 334 of the spring cantilevers 33.

Figure 3:
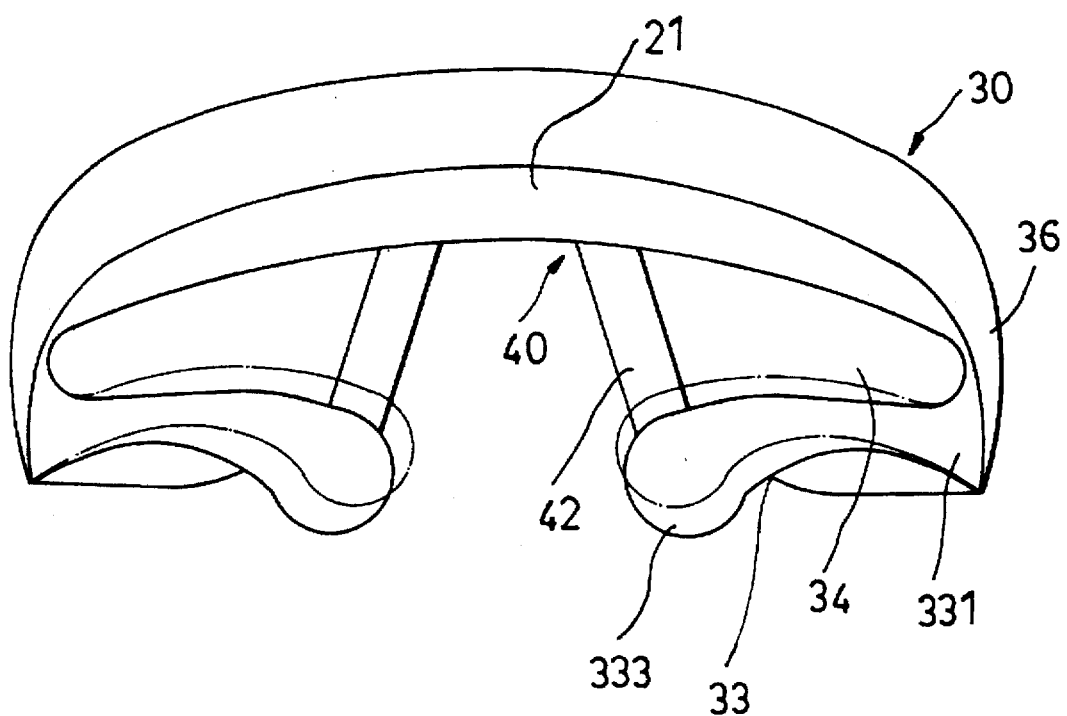
FIG. 3 is a schematic view illustrating how the spring cantilevers of the first preferred embodiment of the bicycle saddle operates according to the present invention.

In use, when a shock wave is produced on the saddle body 30, the shock wave is transmitted to the spring cantilevers 33, thereby causing the latter to vibrate upward and downward in the space 34, as best illustrated in FIG. 3. Therefore, the shock wave can be absorbed by the spring cantilevers 33 and to result in user comfort when the bicycle saddle is in use.

Figure 4:
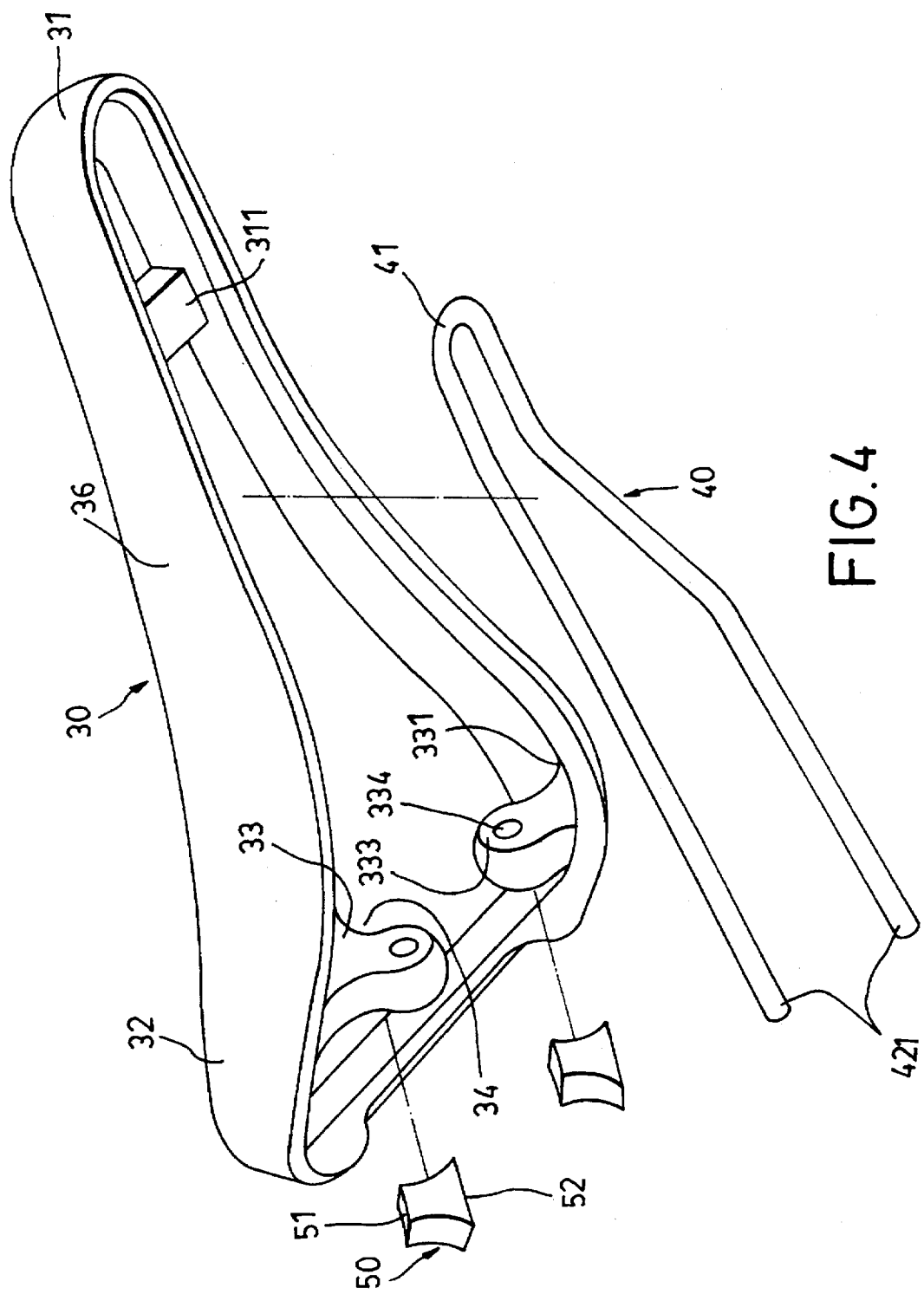
FIG. 4 is an exploded view of a second preferred embodiment of a bicycle saddle according to the present invention.
Figure 5:
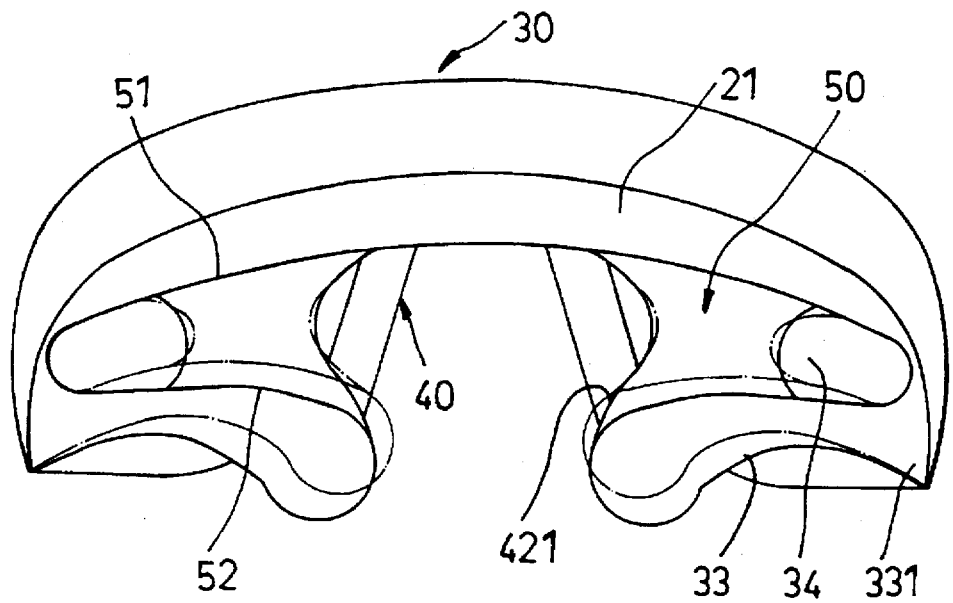
FIG. 5 is a schematic view illustrating how the spring cantilevers of the second preferred embodiment of the bicycle saddle operate according to the present invention.

Referring to FIG. 4, a second preferred embodiment of a bicycle saddle according to the present invention is shown to comprise a saddle body 30, a bracket 40 and two elastomers 50. In this embodiment, the structure of the bicycle saddle is similar to that of the first preferred embodiment except that each of the spring cantilevers 33 and the bottom side of the rear diverging portion 33 has an elastomer 50 fitted therebetween. One or both of the upper and lower faces 51 and 52 of each of the elastomers 50 may be bonded respectively to the bottom side of the rear diverging portion 32 and a respective one of the spring cantilevers 33 by an adhesive, as best illustrated in FIG. 5. The elastomers 50 are used to facilitate absorption of the shock wave from the saddle body 30.

Figure 6:
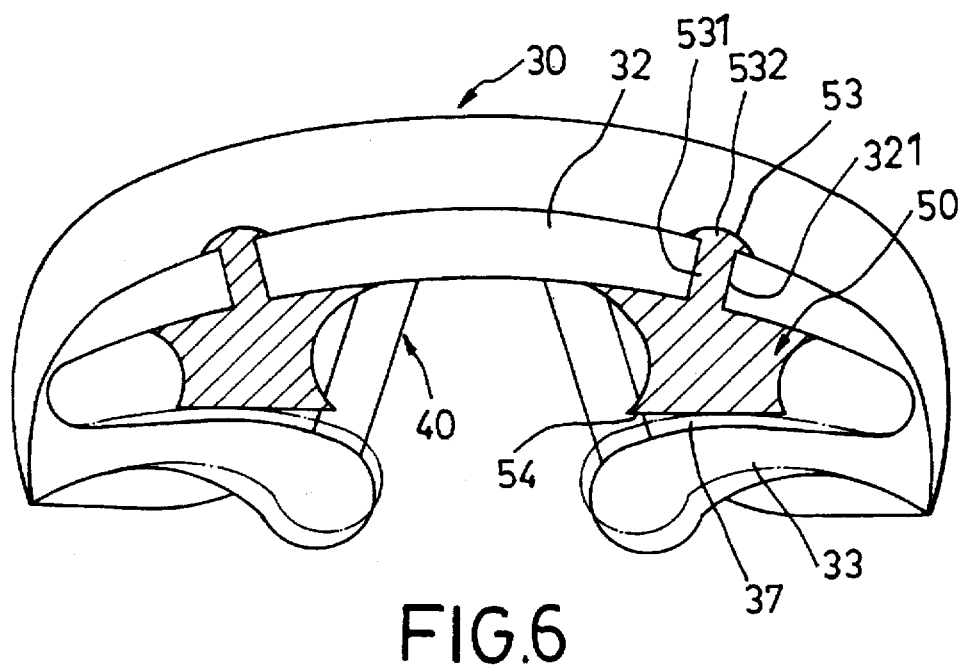
FIG. 6 is a schematic view illustrating how the spring cantilevers of a third preferred embodiment of the bicycle saddle operate according to the present invention.

FIG. 6 illustrates a modification of the second preferred embodiment of a bicycle saddle of the present invention. In this embodiment, the rear diverging portion 32 of the saddle body 30 has two through holes 321 formed therein. Each of the through holes 321 is located just above a respective one of the spring cantilevers 33. Similarly, each of the spring cantilevers 33 and the bottom side of the rear diverging portion 32 has an elastomer 50 disposed therebetween. Each of the elastomers 50 has an upper anchoring portion 53 engaging a respective one of the through holes 321. The upper anchoring portion 53 of each of the elastomers 50 has a neck portion 531 which engages fittingly the respective one of the through holes 321 and an enlarged head portion 532 which is connected to the neck portion 531 above the rear diverging portion 32 in order to prevent separation of the elastomers 50 from the saddle body 30. Each of the elastomers 50 has a lower face 54 which is spaced from a corresponding one of the spring cantilevers 33 in order to produce a space 37 between the lower faces 54 of the elastomers 50 and the spring cantilevers 33.

When a shock wave is transmitted to the spring cantilevers 33, the spring cantilevers 33 begin to vibrate within the space 37 in order to absorb the energy of the shock wave. When the shock wave is so large that the spring cantilevers 33 vibrate and abut the lower faces 54 of the elastomers 50, the shock wave can be absorbed by the elastomers 50 in addition to the absorbing effect of the spring cantilevers 33. An improved shock-absorbing effect can thus be obtained.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangement.

I claim:

1. A bicycle saddle comprising:

a saddle body having a front converging portion, a rear diverging portion and a downwardly extending skirt portion, a front mounting socket member formed at a bottom side of said front converging portion, a pair of spring cantilevers extending from an internal face of said skirt portion toward one another so that a space is formed between said spring cantilevers and a bottom side of said rear diverging portion, each of said spring cantilevers having an engaging portion formed at a free end thereof, an elastomer fitted between each of said spring cantilevers and said bottom side of said rear diverging portion, and a bracket having a converging bent front end which is inserted into said front mounting socket member and a pair of diverging arms, each of said diverging arms having a free end which engages a respective one of said engaging portions of said spring cantilevers.

2. A bicycle saddle comprising:

a saddle body having a front converging portion, a rear diverging portion and a downwardly extending skirt portion, a front mounting socket member formed at a bottom side of said front converging portion, a pair of spring cantilevers extending from an internal face of said skirt portion toward one another so that a space is formed between said spring cantilevers and a bottom side of said rear diverging portion, each of said spring cantilevers having an engaging portion formed at a free end thereof, and a bracket having a converging bent front end which is inserted into said front mounting socket member and a pair of diverging arms, each of said diverging arms having a free end which engages a respective one of said engaging portions of said spring cantilevers;

wherein said rear diverging portion of said saddle body has two through holes passing therethrough, each of said through holes being located just above a respective one of said spring cantilevers, and wherein each of said spring cantilevers and said bottom side of said rear diverging portion has an elastomer disposed therebetween, each of said elastomers having an upper anchoring portion engaging a respective one of said through holes, said upper anchoring portion of each of said elastomers having a neck portion which engages fittingly the respective one of said through holes and an enlarged head portion which is connected to said neck portion above said rear diverging portion of said saddle body in order to prevent separation of said elastomers from said saddle body.

3. The bicycle saddle as claimed in claim 2, wherein each of said elastomers has a lower face which is spaced from a corresponding one of said spring cantilevers.

* * * * *